US008860334B2

(12) United States Patent
Zhao (10) Patent No.: US 8,860,334 B2
(45) Date of Patent: Oct. 14, 2014

(54) DEVICE FOR REMOTELY CONTROLLING MULTI-BAND ANTENNA AND MULTI-BAND ANTENNA SYSTEM

(71) Applicant: Huawei Technologies Co., Ltd., Shenzhen (CN)

(72) Inventor: Zhixiong Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/693,504

(22) Filed: Dec. 4, 2012

(65) Prior Publication Data

US 2013/0127377 A1     May 23, 2013

Related U.S. Application Data

(63) Continuation of application No. PCT/CN2012/076103, filed on May 25, 2012.

(30) Foreign Application Priority Data

Jun. 7, 2011   (CN) .......................... 2011 1 0151008

(51) Int. Cl.
*H04M 1/00*  (2006.01)
*H01Q 3/00*  (2006.01)
*H01Q 3/06*  (2006.01)
*H02P 31/00* (2006.01)

(52) U.S. Cl.
CPC . *H02P 31/00* (2013.01); *H01Q 3/06* (2013.01)
USPC ............ 318/5; 343/766; 455/562.1; 455/560; 318/34

(58) Field of Classification Search
None
See application file for complete search history.

(56) References Cited

U.S. PATENT DOCUMENTS 7,928,916 B2 *   4/2011   Hung et al. .................... 343/702
8,514,145 B2 *   8/2013   Le Sage ......................... 343/894

(Continued)

FOREIGN PATENT DOCUMENTS

CN    2346080      10/1999
CN    1909285      2/2007

(Continued)

OTHER PUBLICATIONS

Chinese Office Action dated Nov. 5, 2013 in corresponding Chinese Patent Application No. 201110151008.4.

(Continued)

*Primary Examiner* — Eduardo Colon Santana
*Assistant Examiner* — Devon Joseph
(74) *Attorney, Agent, or Firm* — Huawei Technologies Co., Ltd.

(57) ABSTRACT

The present invention relates to the antenna control field, and discloses a device for remotely controlling a multi-band antenna and a multi-band antenna system. The device for remotely controlling a multi-band antenna includes an antenna panel 100, where the antenna panel 100 is disposed with a control board 101 and at least two motor modules 102; each of the motor modules 102 includes a connector 1022, each of the motor modules 102 electrically connects, via its connector 1022, to the control board 101 to receive a control command sent by the control board 101. In the embodiments of the present invention, an adjustment to a downtilt of a multi-band antenna may be implemented, and an occupied space of the antenna panel and a cost for adjusting a downtilt may be reduced.

17 Claims, 6 Drawing Sheets

(56) References Cited

U.S. PATENT DOCUMENTS

| | | | |
|---|---|---|---|
| 2005/0272470 A1* | 12/2005 | Hurler et al. | 455/557 |
| 2006/0284775 A1* | 12/2006 | Kaplan et al. | 343/713 |
| 2008/0316133 A1* | 12/2008 | Guixa Arderiu | 343/766 |
| 2009/0264077 A1 | 10/2009 | Damnjanovic | |
| 2010/0008282 A1 | 1/2010 | Bhattad et al. | |
| 2010/0008295 A1 | 1/2010 | Ji et al. | |
| 2010/0151873 A1 | 6/2010 | Gorokhov et al. | |
| 2010/0201591 A1* | 8/2010 | Girard et al. | 343/766 |
| 2014/0022124 A1* | 1/2014 | Zimmermann et al. | 342/368 |

FOREIGN PATENT DOCUMENTS

| | | |
|---|---|---|
| CN | 101013769 | 8/2007 |
| CN | 200990608 | 12/2007 |
| CN | 101123325 | 2/2008 |
| CN | 101304580 | 11/2008 |
| CN | 101420746 A | 4/2009 |
| CN | 101631351 A | 1/2010 |
| CN | 201478450 | 5/2010 |
| CN | 101772118 A | 7/2010 |
| CN | 201655978 | 11/2010 |
| CN | 102263328 | 11/2011 |
| EP | 1838123 A1 | 9/2007 |
| EP | 1121245 B1 * | 12/2008 |
| WO | 2009/102774 | 8/2009 |
| WO | 2009/102775 | 8/2009 |

OTHER PUBLICATIONS

Form PCT/ISA/210, dated Aug. 30, 2012, in corresponding International Application No. PCT/CN2012/076103 (3 pp.).

Form PCT/ISA/220, dated Aug. 30, 2012, in corresponding International Application No. PCT/CN2012/076103 (3 pp.).

Form PCT/ISA/237, dated Aug. 30, 2012, in corresponding International Application No. PCT/CN2012/076103 (6 pp.).

International Search Report mailed Sep. 8, 2011 for corresponding International Application No. PCT/CN2011/074992.

Written Opinion of the International Searching Authority mailed Sep. 8, 2011 for corresponding International Application No. PCT/CN2011/074992.

3GPP™, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", Lte™, 3GPP TS 36.300, V10.1.0, Sep. 2010; pp. 1-192.

3GPP™, "3$^{rd}$ Generation Partnership Project; Technical Specification Group Radio Access Network; Evolved Universal Terrestrial Radio Access (E-UTRA); Radio Resource Control (RRC); Protocol specification (Release 9)", Lte™ 3GPP TS 36.331, V9.4.0, Sep. 2010, pp. 1-252.

3GPP™, "3$^{rd}$ Generation Partnership Project; Technical Specification Group Radio Access Network; Evolved Universal Terrestrial Radio Access Network (E-UTRAN); X2 application protocol (X2AP) (Release 9)", Lte™, 3GPP TS 36.423, V9.4.0, Sep. 2010, pp. 1-121.

International Search Report, dated Aug. 30, 2012, in corresponding International Application No. PCT/CN2012/076103 (2 pp.).

Office Action, dated Mar. 5, 2013, in corresponding Chinese Application No. 201110151008.4 (16 pp.).

* cited by examiner

DEVICE FOR REMOTELY CONTROLLING MULTI-BAND ANTENNA AND MULTI-BAND ANTENNA SYSTEM

CROSS-REFERENCE TO RELATED APPLICATIONS

This application is a continuation of International Application No. PCT/CN2012/076103, filed on May 25, 2012, which claims priority to Chinese Patent Application No. 201110151008.4, filed on Jun. 7, 2011, both of which are hereby incorporated by reference in their entireties.

FIELD OF THE INVENTION

The present invention relates to the antenna control field, in particular to a device for remotely controlling a multi-band antenna and a multi-band antenna system.

BACKGROUND OF THE INVENTION

In the antenna field, a multi-band antenna is capable of implementing functions of two or more than two frequency bands (for example, 800 MHz frequency band and 3G frequency band). An adjustment to a downtilt of the multi-band antenna may effectively enhance and optimize network coverage. A commonly used manner for adjusting the downtilt of the multi-band antenna is an electrical downtilt manner. As a control core of the electrical downtilt manner, a remote control unit (Remote Control Unit, RCU) is also referred to as an electrical downtilt unit. The RCU has functions of receiving a base station control command, precisely adjusting the downtilt of the multi-band antenna, and so on.

When the RCU is adopted to adjust the downtilt of the multi-band antenna, each frequency band uses one RCU. Each RCU includes a motor and a control board. The control board enables the motor to rotate after receiving the base station control command, thereby driving a mechanism for driving an antenna characteristic adjustment apparatus to perform a translational movement to implement the adjustment to the downtilt of the multi-band antenna. Taking a 6-band antenna as an example, 6 RCUs need to be used to separately control 6 mechanisms for driving an antenna characteristic adjustment apparatus. The translational movement of the mechanism for driving an antenna characteristic adjustment apparatus may implement the adjustment to the downtilt of the antenna.

In practice, it is found that each existing RCU includes a motor and a control board. The larger the number of frequency bands of the multi-band antenna is, the larger the number of RCUs used to adjust a downtilt is, which results in a larger occupied space of an antenna panel. In addition, more RCUs also result in a higher cost for adjusting a downtilt.

SUMMARY OF THE INVENTION

Embodiments of the present invention provide a device for remotely controlling a multi-band antenna and a multi-band antenna system, which are used to implement an adjustment to a downtilt of a multi-band antenna and reduce an occupied space of an antenna panel and a cost for adjusting a downtilt.

A device for remotely controlling a multi-band antenna includes an antenna panel, where the antenna panel is disposed with a control board and at least two motor modules, each of the motor modules includes a connector, and each of the motor modules electrically connects, via its connector, to the control board to receive a control command sent by the control board.

A multi-band antenna system includes the device for remotely controlling a multi-band antenna and a multi-band antenna, where a motor module of the device for remotely controlling a multi-band antenna includes a clutch, and the motor module adaptively connects, via its clutch, to a mechanism for driving an antenna characteristic adjustment apparatus of the multi-band antenna.

In the embodiments of the present invention, the device for remotely controlling a multi-band antenna includes the antenna panel, on which the control board and the at least two motor modules are disposed, and each of the motor modules electrically connects, via its connector, to the control board to receive the control command sent by the control board, so that one control board is capable of enabling multiple motor modules to rotate. Rotation of the motor modules may drive the mechanism for driving an antenna characteristic adjustment apparatus of the multi-band antenna to perform a translational movement to implement the adjustment to the downtilt of the multi-band antenna. In the embodiments of the present invention, a control board is separated from a motor in an existing RCU, and one control board is used to control multiple motor modules to implement the adjustment to the downtilt of the multi-band antenna. Compared with an existing electrical downtilt manner in which one frequency band uses one RCU, the device for remotely controlling a multi-band antenna in the embodiments of the present invention is capable of reducing the occupied space of the antenna panel and the cost for adjusting the downtilt. An effect is obvious especially in a case that a multi-band antenna has many frequency bands.

BRIEF DESCRIPTION OF THE DRAWINGS

To illustrate the technical solutions in the embodiments of the present invention or in the prior art more clearly, accompanying drawings required for describing the embodiments are briefly introduced in the following. Apparently, the accompanying drawings in the following description are merely some embodiments of the present invention, and persons of ordinary skill in the art may further obtain other drawings according to these accompanying drawings without creative efforts.

In the figures, 100 indicates an antenna panel; 101 indicates a control board; 102 indicates a motor module; 103 indicates a feeder connector; 1021 indicates a clutch; 1022 indicates a connector of the motor module; 104 indicates a fastener; 105 indicates a mounting hole of the motor module; 1011 indicates a connector of the control board; 1012 indicates a receiving port of the control board; and 1013 indicates a serial port of the control board.

DETAILED DESCRIPTION OF THE EMBODIMENTS

The following clearly and completely describes the technical solutions in the embodiments of the present invention with reference to the accompanying drawings in the embodiments of the present invention. Apparently, the embodiments to be described are merely part rather than all of the embodiments of the present invention. All other embodiments obtained by persons of ordinary skill in the art based on the embodiments of the present invention without creative efforts shall fall within the protection scope of the present invention.

Figure 1:
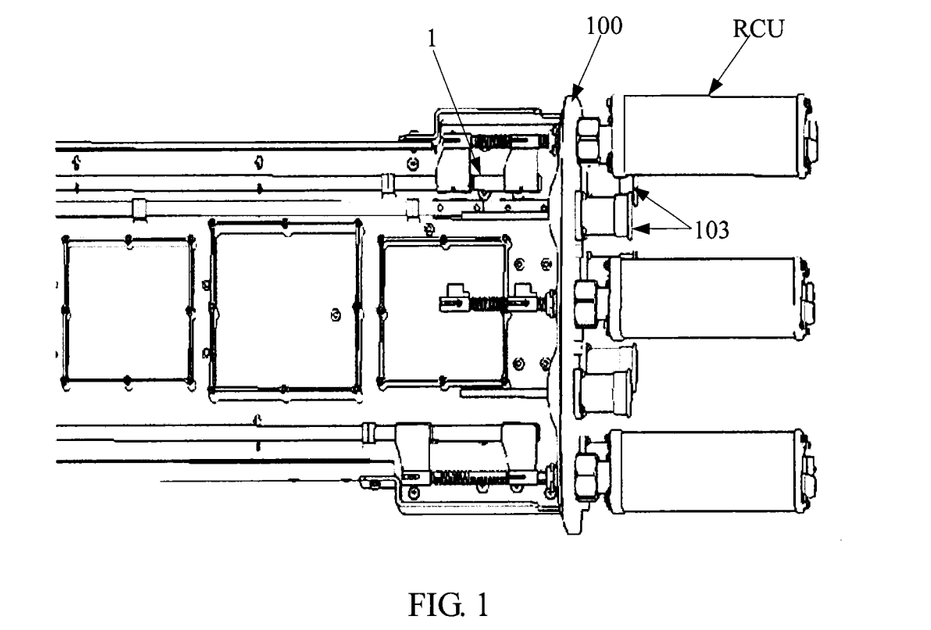
FIG. 1 is an assembly schematic diagram of an RCU of an existing 3-band antenna.

Before a device for remotely controlling a multi-band antenna provided in an embodiment of the present invention is described in detail, in an embodiment of the present invention, assembly of an RCU of an existing multi-band antenna is introduced first. Referring to FIG. 1, FIG. 1 is an assembly schematic diagram of an RCU of an existing 3-band antenna. As shown in FIG. 1, 3 RCUs need to be assembled on an antenna panel 100 to implement an adjustment to a downtilt of a 3-band antenna. Each of the RCUs includes a motor and a control board (not shown in FIG. 1). The control board enables the motor to rotate after receiving a base station control command, thereby driving a mechanism for driving an antenna characteristic adjustment apparatus 1 to perform a translational movement to implement the adjustment to the downtilt of the multi-band antenna. On the antenna panel 100 of the 3-band antenna shown in FIG. 1, several pairs of feeder connectors 103 are disposed to receive base station signals and send signals to a base station. In practical application, the number of feeder connectors 103 may either be the same as or different from that of frequency bands of the multi-band antenna. Each of the RCUs includes a motor and a control board; therefore, in a case that the multi-band antenna has many frequency bands, more RCUs are used for adjusting the downtilt, which causes the RCUs to occupy a larger space of the antenna panel 100, thereby affecting an installation space. In addition, in a case that there are many RCUs, many control boards are used and the control boards are expensive components, which results in a relatively high cost for adjusting a downtilt.

In view of the foregoing defects, embodiments of the present invention provide a device for remotely controlling a multi-band antenna and a multi-band antenna system, which are used to implement an adjustment to a downtilt of a multi-band antenna, thereby reducing an occupied space of an antenna panel to leave sufficient installation and operation spaces for other elements on the antenna panel, and reducing a cost for adjusting a downtilt.

Figure 2:
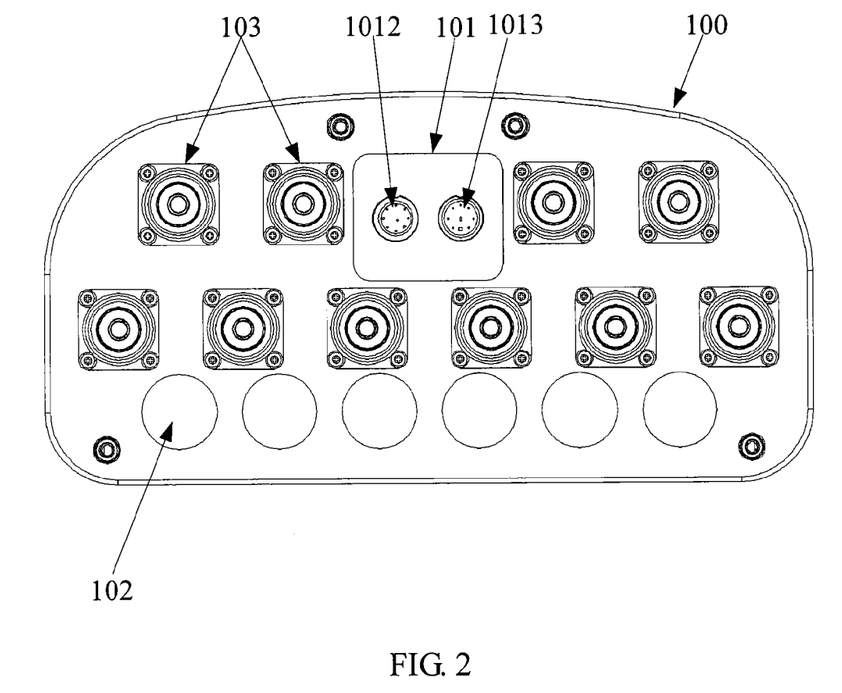
FIG. 2 is a schematic structural diagram of a device for remotely controlling a multi-band antenna according to an embodiment of the present invention.

Referring to FIG. 2, FIG. 2 is a schematic structural diagram of a device for remotely controlling a multi-band antenna according to an embodiment of the present invention. The device for remotely controlling a multi-band antenna may include an antenna panel 100, where the antenna panel 100 is disposed with a control board 101 and at least two motor modules 102, each of the motor modules 102 includes a connector 1022, and each of the motor modules 102 connects, via its connector 1022, to the control board 101 to receive a control command sent by the control board 101.

The control board 101 is configured to receive a control signal (from a base station or a control terminal) and send a control command to the at least two motor modules 102. The at least two motor modules 102 operates synchronously or asynchronously (independently) according to the control command, so as to implement an adjustment to an antenna characteristic, such as a downtilt, an azimuth, a vertical beam width, and a horizontal beam width, of a multi-band antenna that is configured with the device for remotely controlling a multi-band antenna.

As an alternative implementation manner, the number of motor modules 102 may either be the same as or different from that of frequency bands of the multi-band antenna. When the number of motor modules 102 is the same as that of frequency band of the multi-band antenna, the motor modules 102 independently operate under the control of the control board 101 to implement an adjustment to an antenna characteristic of different frequency bands of the multi-band antenna. When the number of motor modules 102 is different from that of frequency bands of the multi-band antenna, a transmission link adjustment apparatus 210 may be disposed at an end of a motor module 102 to achieve an objective of adjusting an antenna characteristic of multiple frequency bands via a single motor module 102.

Figure 3:
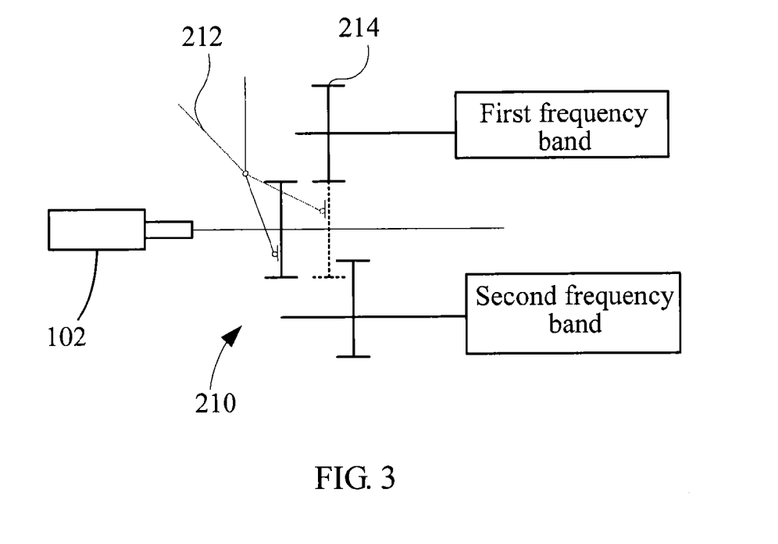
FIG. 3 is a schematic diagram of a drive apparatus of a device for remotely controlling a multi-band antenna according to an embodiment of the present invention.

As shown in FIG. 3, the motor module 102 may achieve an objective of selectively adjusting an antenna characteristic of multiple frequency bands of the multi-band antenna via the transmission link adjustment apparatus 210. The transmission link adjustment apparatus 210 includes a gear selection apparatus 212 and multiple driving wheels 214. The gear selection apparatus 212 and the multiple driving wheels 214 form a single input multiple output driving system, where the gear selection apparatus 212 electrically connects to the control board 101 to select, under the control of the control board 101, a driving wheel 214 that effectively cooperates with the motor module 102, so that an effective driving link is established between the motor module 102 and an antenna characteristic adjustment apparatus of different frequency bands to implement the adjustment to the antenna characteristic of different frequency bands.

As an alternative implementation manner, in the device for remotely controlling a multi-band antenna provided in this embodiment of the present invention, the antenna panel 100 may also be disposed with at least a pair of feeder connectors 103; where the feeder connectors 103 are mainly configured to connect to feeders to transmit a signal of the base station to the multi-band antenna or transmit a signal received by the multi-band antenna to the base station. In practical application, the number of feeder connectors 103 may either be the same as or different from that of frequency bands of the multi-band antenna, which is not limited in this embodiment of the present invention.

As an alternative implementation manner, in the device for remotely controlling a multi-band antenna provided in this embodiment of the present invention, a width of the antenna panel 100 may adapt to that of a radome of the multi-band antenna, and a height of the antenna panel 101 may adapt to that of the radome of the multi-band antenna. That is to say, the device for remotely controlling a multi-band antenna provided in this embodiment of the present invention may be used as a terminal panel of the radome of the multi-band antenna.

Figure 4:
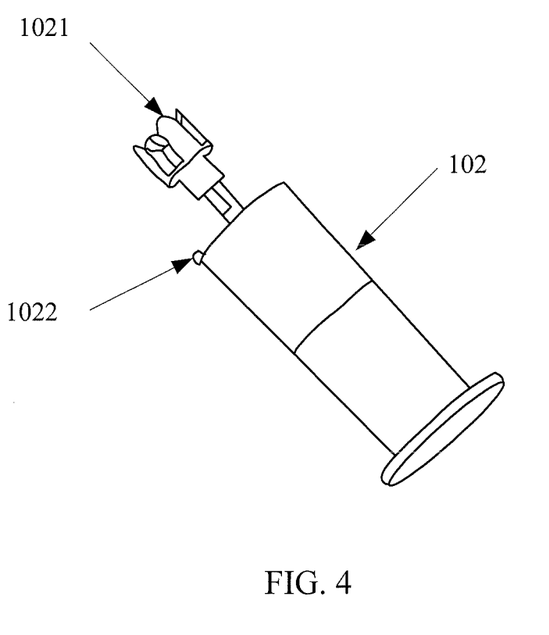
FIG. 4 is a schematic structural diagram of a motor module according to an embodiment of the present invention.

Referring to FIG. 4, FIG. 4 is a schematic structural diagram of a motor module 102 according to an embodiment of the present invention. As shown in FIG. 4, an output shaft end of each motor module 102 may be disposed with a clutch 1021. Each motor module 102 includes a connector 1022. Each motor module 102 may directly or indirectly connect, via its connector 1022, to the control board 101 to operate synchronously and or asynchronously (independently) under the control of the control board 101.

The clutch 1021 is disposed at the output shaft end of the motor module 102, and the clutch 1021 is configured to implement a connection between the motor module 102 and a mechanism for driving an antenna characteristic adjustment apparatus of the multi-band antenna. When the control board 101 enables the motor module 102 to rotate, rotation of the motor module 102 may drive the clutch 1021 disposed at the output shaft end of the motor module 102 to rotate, so that the mechanism for driving an antenna characteristic adjustment apparatus which is of the multi-band antenna and adapts to the clutch 1021 is driven to move to adjust the antenna characteristic of the multi-band antenna.

Figure 5:
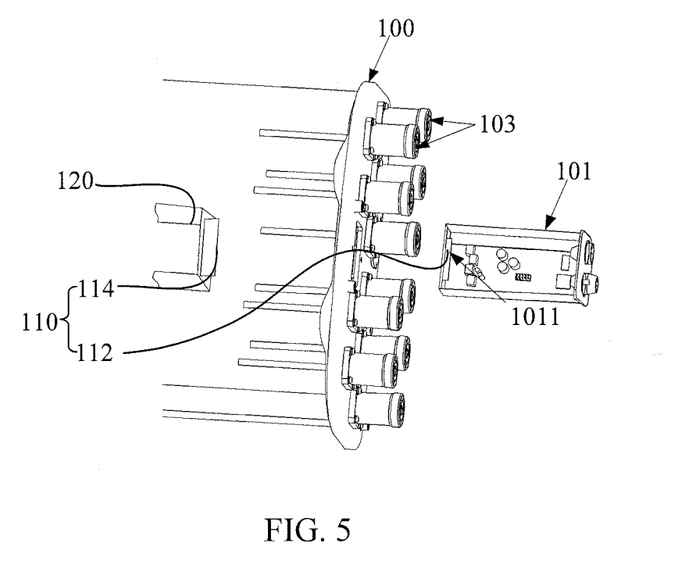
FIG. 5 is a schematic diagram of a device for remotely controlling a multi-band antenna before a control board is inserted into an antenna panel according to an embodiment of the present invention.
Figure 6:
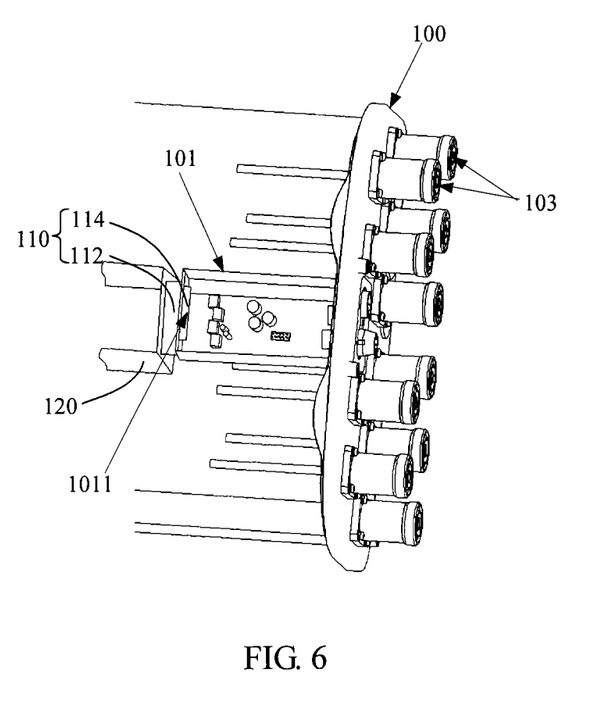
FIG. 6 is a schematic diagram of a device for remotely controlling a multi-band antenna after a control board is inserted into an antenna panel according to an embodiment of the present invention.

As an alternative implementation manner, as shown in FIG. 5 and FIG. 6, the device for remotely controlling a multi-band antenna provided in this embodiment of the present invention further includes a connector 110. The connector 110 includes a first connection port 112 and a second connection port 114. The first connection port 112 and the second connection port 114 may cooperate with each other in a plug-in manner to connect a signal transmission link of the first connection port 112 to that of the second connection port 114. The first connection port 112 of the connector 110 is disposed on the control board 101, and is configured to connect to a control signal output line on the control board 101. The second connection port 114 is disposed on a support plate 120 in the device for remotely controlling a multi-band antenna, electrically connects to the connector 1022 of the motor module 102, and corresponds to the first connection port 112 of the connector 110. Referring to FIG. 5, when the control board 101 is inserted into the antenna panel 100, the first connection port 112 and the second connection port 114 of the connector 110 cooperate with each other to implement an electrical connection between the control board 101 and the motor module 102 and separately transmit a control signal of the control board 101 to a corresponding motor module 102. In this embodiment, the clutch 1021 of each motor module 102 adaptively connects to the mechanism for driving an antenna characteristic adjustment apparatus of the multi-band antenna.

As an alternative implementation manner, the connector 1022 of each motor module 102 may be disposed on an end face where an output shaft of the motor module 102 is located.

As an alternative implementation manner, in the device for remotely controlling a multi-band antenna provided in this embodiment of the present invention, the antenna panel 100 may include a panel mounting hole. Correspondingly, the control board 101 may be inserted into the panel mounting hole of the antenna panel 100. That is to say, the control board 101 may be installed in the panel mounting hole of the antenna panel 100 in a pluggable manner. Referring to FIG. 5 and FIG. 6, FIG. 5 is a schematic diagram of the device for remotely controlling a multi-band antenna before the control board 101 is inserted into the antenna panel 100 according to this embodiment of the present invention. FIG. 6 is a schematic diagram of the device for remotely controlling a multi-band antenna after the control board 101 is inserted into the antenna panel 100 according to this embodiment of the present invention. As shown in FIG. 5 and FIG. 6, the control board 101 is installed, in the pluggable manner, in the panel mounting hole of the antenna panel 100 of the device for remotely controlling a multi-band antenna. Installing the control board 101 in the pluggable manner may improve flexibility and operability of a layout design of the antenna panel.

As an alternative implementation manner, in the device for remotely controlling a multi-band antenna provided in this embodiment of the present invention, the antenna panel 100 may include multiple motor module mounting holes 105. Correspondingly, each motor module 102 may be inserted into a motor module mounting hole 105 of the antenna panel 100. That is to say, each motor module 102 may be installed, in a pluggable manner, in the motor module mounting hole 105 of the antenna panel 100. Likewise, installing the motor modules 102 in the pluggable manner may improve flexibility and operability of a layout design of the antenna panel.

As shown in FIG. 2, in the device for remotely controlling a multi-band antenna provided in this embodiment of the present invention, the control board 101 is also disposed with a receiving port 1012 that is capable of receiving a base station control command. After receiving the base station control command, the receiving port 1012 may input the base station control command to the control board 101, so that the control board 102 is capable of enabling the motor module 102 to rotate. As an alternative implementation manner, the control board 102 in this embodiment of the present invention may simultaneously enable one or multiple motor modules 102 to rotate, which is not limited in this embodiment of the present invention.

As shown in FIG. 2, in the device for remotely controlling a multi-band antenna provided in this embodiment of the present invention, the control board 101 is further disposed with a serial port 1013. The device for remotely controlling a multi-band antenna may connect to another device for remotely controlling a multi-band antenna in series via the serial port 1013 to implement an adjustment to a downtilt of more frequency bands.

Figure 7:
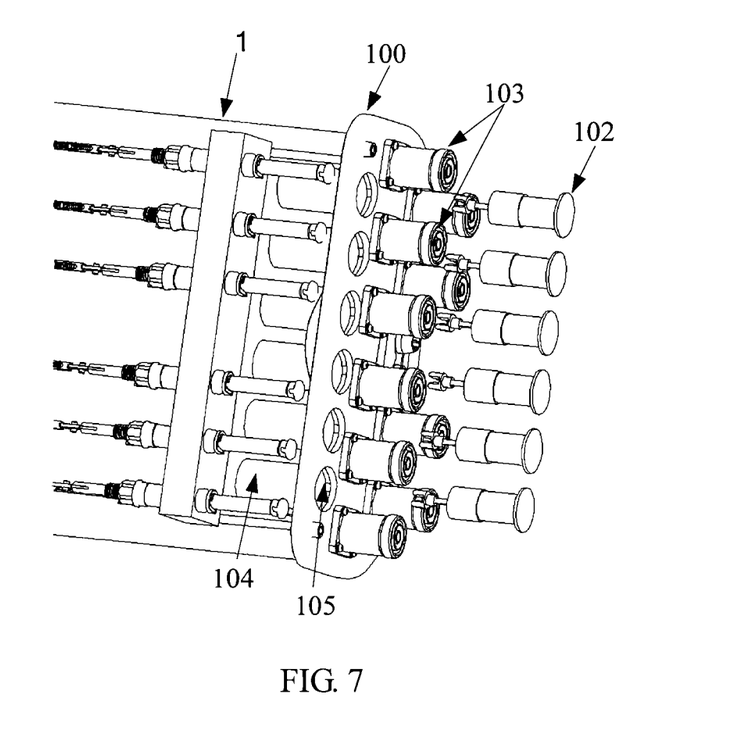
FIG. 7 is an assembly schematic diagram of a device for remotely controlling a multi-band antenna according to an embodiment of the present invention.

As an alternative implementation manner, in the device for remotely controlling a multi-band antenna provided in this embodiment of the present invention, each motor module 102 may be tightly installed in a fastener 104. The fastener 104 is fastened in a motor module mounting hole 105 of the antenna panel 100. In addition, the clutch 1021 and the connector 1022 of the motor module 102 extend from the fastener 104. As an alternative implementation manner, the fastener 104 may have a structure similar to a cylinder. Referring to FIG. 7, FIG. 7 is an assembly schematic diagram of a device for remotely controlling a multi-band antenna according to an embodiment of the present invention. As shown in FIG. 7, one end of each fastener 104 is fastened in a motor module mounting hole 105 of the antenna panel 100. Distances between the other end of each fastener 104 and the antenna panel 100 may be the same, which provides an elegant appearance. After the clutch 1021 and the connector 1022 of the motor module 102 extend from the fastener 104, the clutch 1021 may adaptively connect to the mechanism for driving an antenna characteristic adjustment apparatus 1 of the multi-band antenna, and the connector 1022 may connect to the control board 101.

As shown in FIG. 7, when the motor module 102 is tightly installed in the fastener 104, a pedestal of each motor module 102 that is tightly installed in the fastener 104 may be embedded in the antenna panel 100, so that an elegant appearance is provided for the layout design of the antenna panel, and the occupied space of the antenna panel is reduced.

In this embodiment of the present invention, the antenna panel 100 included in the device for remotely controlling a multi-band antenna is disposed with the control board 101 and the at least two motor modules 102. In addition, each motor module 102 connects, via its connector 1022, to the control board 101, so that the control board 101 is capable of enabling multiple motor modules 102 to rotate. The rotation of the motor module 102 may drive the clutch 1021 disposed at the output shaft end of the motor module 102 to rotate. In this way, the mechanism for driving an antenna characteristic adjustment apparatus 1 which is of the multi-band antenna and adapts to the clutch 1021 may be driven to perform a translational movement to implement the adjustment to the downtilt of the multi-band antenna. In this embodiment of the present invention, a control board is separated from a motor in an existing RCU, and one control board 101 is used to control multiple motor modules 102 to implement the adjustment to the downtilt of the multi-band antenna. Compared with an existing electrical downtilt manner in which one frequency band uses one RCU, the device for remotely controlling a multi-band antenna in this embodiment of the present invention is capable of reducing the occupied space of the antenna panel and the cost for adjusting the downtilt. An effect is obvious especially in a case that a multi-band antenna has many frequency bands.

It can be understood that the number of control boards 101 is not limited in this embodiment of the present invention and may be adjusted correspondingly according to the number of motor modules 102 that need to be controlled. For example, two control boards 101 control four motor modules 102, where each of the control boards 101 controls two motor modules 102; or two control boards 101 control three motor modules 102, where one control board 102 controls two motor modules 102, and the other control board controls another motor module 102. The control board 101 may be disposed on the antenna panel by using the manner in the foregoing embodiment of the present invention.

Figure 8:
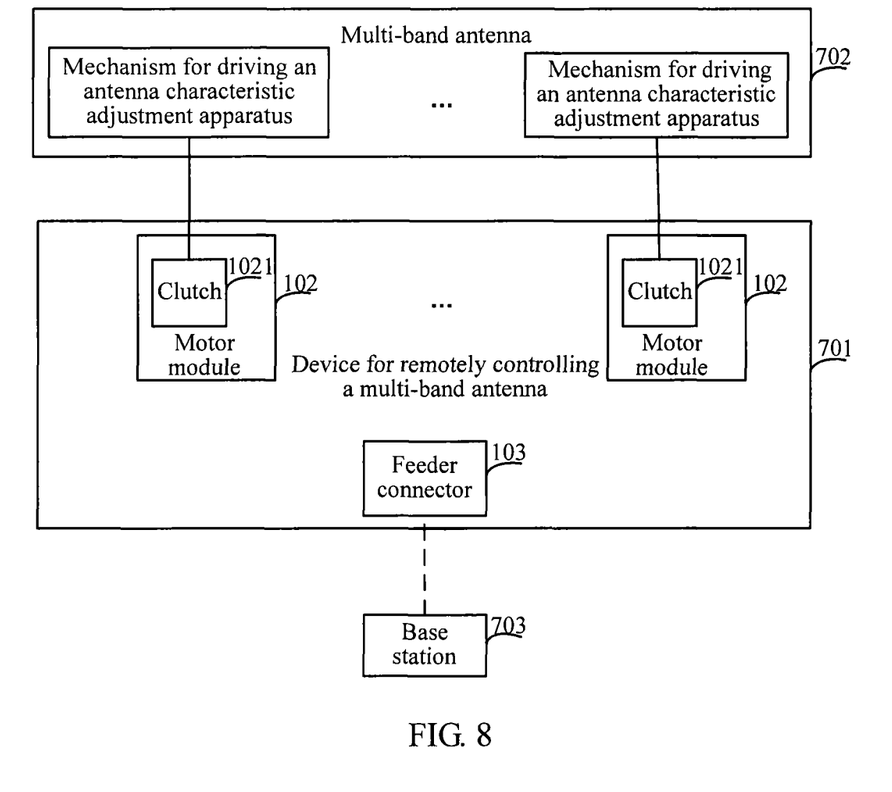
FIG. 8 is a schematic structural diagram of a multi-band antenna system according to an embodiment of the present invention.

Referring to FIG. 8, FIG. 8 is a schematic structural diagram of a multi-band antenna system according to an embodiment of the present invention. The multi-band antenna system may include:

a device 701 for remotely controlling a multi-band antenna and a multi-band antenna 702; where a structure of the device 701 for remotely controlling a multi-band antenna is described in detail in the foregoing and is not repeatedly described here in this embodiment of the present invention.

As shown in FIG. 7, a clutch 1021 of each motor module 102 included in the device 701 for remotely controlling a multi-band antenna may adaptively connect to each mechanism for driving an antenna characteristic adjustment apparatus of the multi-band antenna 702.

Under a condition that the clutch 1021 adaptively connects to the mechanism for driving an antenna characteristic adjustment apparatus of the multi-band antenna 702, if a control board 102 included in the device 701 for remotely controlling a multi-band antenna enables a motor module 102 to rotate, rotation of the motor module 102 may drive the clutch 1021 that is disposed at an output shaft end of the motor module 102 to rotate. In this way, the mechanism for driving an antenna characteristic adjustment apparatus which is of the multi-band antenna 702 and adapts to the clutch 1021 may be driven to perform a translational movement to implement an adjustment to a downtilt of the multi-band antenna.

As shown in FIG. 8, the multi-band antenna system may further include a base station 703, where the base station 703 connects to, in a communicable manner, a feeder connector 103 included in the device 701 for remotely controlling a multi-band antenna. The dashed line between the base station 703 and the feeder connector 103 included in the device 701 for remotely controlling a multi-band antenna indicates a radio connection.

The multi-band antenna system provided in this embodiment of the present invention is capable of implementing the adjustment to the downtilt of the multi-band antenna and reducing an occupied space of a antenna panel and a cost for adjusting a downtilt.

The foregoing introduces the device for remotely controlling a multi-band antenna and the multi-band antenna system provided in the embodiments of the present invention in detail. Specific cases are used for illustrating principles and implementation manners of the present invention. The foregoing description about the embodiments is merely used to help understanding of the present invention. Meanwhile, persons skilled in the art may make modifications to the specific implementation manners and application scopes according to the idea of the present invention. In conclusion, the content of this specification should not be construed as a limitation to the present invention.

What is claimed is:

1. A device for remotely controlling a multi-band antenna, comprising:
    an antenna panel;
    a control board on the antenna panel;
    a number of motor modules on the antenna panel including at least two motor modules, each motor module being connected to the same control board and configured to receive a control command from the control board, the number of motor modules being less than a number of frequency bands of the multi-band antenna; and
    a transmission link adjustment apparatus connected to one of the motor modules, the transmission link adjustment apparatus being configured to adjust at least one antenna characteristic differently for each of at least two frequency bands in the number of frequency bands in accordance with input from the motor module and the control command from the control board,
    wherein the antenna characteristic includes at least one of a downtilt, an azimuth, a vertical beam width, and a horizontal beam width.

2. The device for remotely controlling a multi-band antenna according to claim 1, further comprising a connector, the connector comprises:
    a first connection port on the control board, configured to connect to a control signal output line on the control board;
    a second connection port on a support plate in the device, the second connection port being connected to one of the number of motor modules,
    wherein the first connection port and the second connection port are configured to provide an electrical connection between the connector and the control board.

3. The device for remotely controlling a multi-band antenna according to claim 1,
    wherein the control board is configured to send the control command to at least two of the number of motor modules responsive to a control signal received by the control board, and the at least two of the number of motor modules are further configured to synchronously or asynchronously operate in accordance with the control command for adjusting the at least one antenna characteristic.

4. The device for remotely controlling a multi-band antenna according to claim 1, wherein the transmission link adjustment apparatus comprises a gear selection apparatus and multiple driving wheels, and wherein the gear selection apparatus is configured to be electrically connected to the control board to select, responsive to the control command of the control board, a driving wheel that cooperates with the motor module, establishing a driving link between the motor module and an antenna characteristic adjustment apparatus of different frequency bands to adjust the at least one antenna characteristic of different frequency bands.

5. The device for remotely controlling a multi-band antenna according to claim 1, wherein the antenna panel further comprises at least one pair of feeder connectors, the pair of feeder connectors are configured to connect to feeders to transmit a signal of a base station to the multi-band antenna or transmit a signal received by the multi-band antenna to a base station.

6. The device for remotely controlling a multi-band antenna according to claim 1, wherein the control board further comprises a receiving port configured to receive a base station control command and a serial port configured to connect the device to another device for remotely controlling a multi-band antenna in series.

7. The device for remotely controlling a multi-band antenna according to claim 1, wherein a width of the antenna panel is configured in accordance with a width of a radome of the multi-band antenna, and a height of the antenna panel is configured in accordance with a height of the radome of the multi-band antenna.

8. The device for remotely controlling a multi-band antenna according to claim 1, wherein at least one of a width and a height of the antenna panel is configured to be adaptable to one of a corresponding width and height of a radome of the multi-band antenna.

9. A multi-band antenna system, comprising and a multi-band antenna and a device for remotely controlling the multi-band antenna, wherein the device for remotely controlling the multi-band antenna comprises:
    an antenna panel;
    a control board on the antenna panel;
    a number of motor modules on the antenna panel including at least two motor modules, each motor module being connected to the same control board and configured to receive a control command from the control board, the number of motor modules being less than a number of frequency bands of the multi-band antenna; and
    a transmission link adjustment apparatus connected to one of the motor modules, the transmission link adjustment apparatus being configured to adjust at least one antenna characteristic differently for each of at least two frequency bands in the number of frequency bands in accordance with input from the motor module and the control command from the control board,
    wherein each motor module comprises a clutch, and the motor module adaptively connects to, via the clutch, a mechanism for driving an antenna characteristic adjustment apparatus of the multi-band antenna, and
    wherein the antenna characteristic includes at least one of a downtilt, an azimuth, a vertical beam width, and a horizontal beam width.

10. The multi-band antenna system according to claim 9, wherein the device further comprises a connector, the connector comprises:
    a first connection port on the control board, configured to connect to a control signal output line on the control board;
    a second connection port on a support plate in the device, the second connection port being connected to one of the number of motor modules,
    wherein the first connection port and the second connection port are configured to provide an electrical connection between the connector and the control board.

11. The multi-band antenna system according to claim 9, wherein the control board is configured to send the control command to at least two of the number of motor modules responsive to a control signal received by the control board, and the at least two of the number of motor modules are further configured to synchronously or asynchronously operate in accordance with the control command for adjusting the at least one antenna characteristic.

12. The multi-band antenna system according to claim 9, wherein the transmission link adjustment apparatus comprises a gear selection apparatus and multiple driving wheels, and
    wherein the gear selection apparatus is configured to be electrically connected to the control board to select, responsive to the control command of the control board, a driving wheel that cooperates with the motor module, establishing a driving link between the motor module and an antenna characteristic adjustment apparatus of different frequency bands to adjust the at least one antenna characteristic of different frequency bands.

13. The multi-band antenna system according to claim 9, wherein the antenna panel further comprises at least a pair of feeder connectors, the feeder connectors are configured to connect to feeders to transmit a signal of a base station to the multi-band antenna or transmit a signal received by the multi-band antenna to a base station.

14. The multi-band antenna system according to claim 9, wherein the control board further comprises a receiving port configured to receive a base station control command and a serial port configured to connect the device to another device for remotely controlling a multi-band antenna in series.

15. The multi-band antenna system according to claim 9, wherein a width of the antenna panel is configured in accordance with a width of a radome of the multi-band antenna, and a height of the antenna panel is configured in accordance with a height of the radome of the multi-band antenna.

16. The multi-band antenna system according to claim 9, wherein at least one of a width and a height of the antenna panel is configured to be adaptable to one of a corresponding width and height of a radome of the multi-band antenna.

17. The multi-band system according to claim 9, further comprising:
    a base station connected to, in a communicable manner, the feeder connectors comprised in the device.

* * * * *